Figure 2:
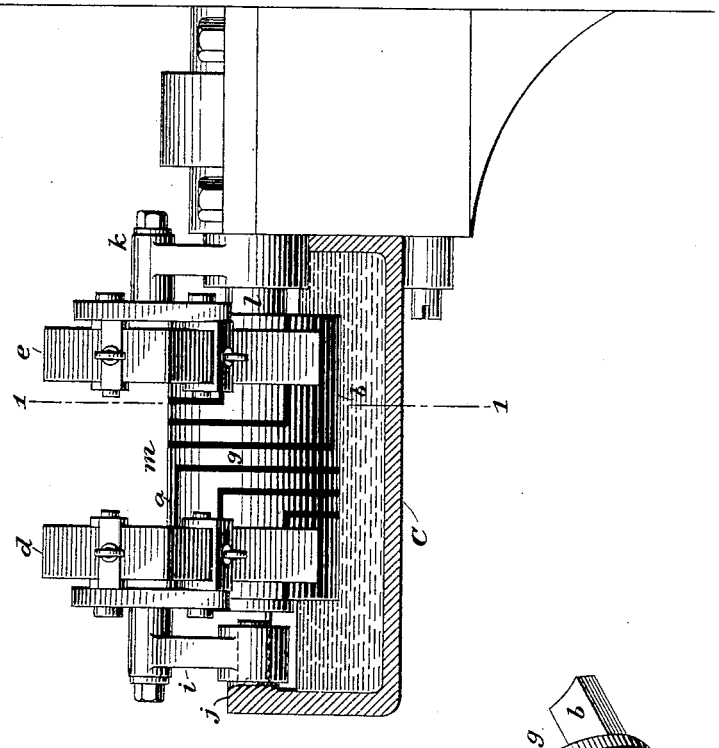

(No Model.) 6 Sheets—Sheet 2.
O. LUGO.
ELECTRIC MOTOR AND DYNAMO ELECTRIC MACHINE.
No. 394,075. Patented Dec. 4, 1888.
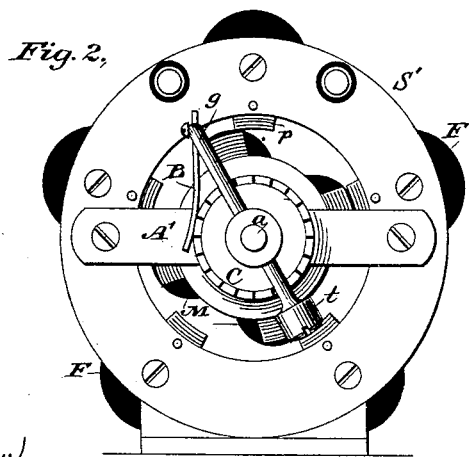
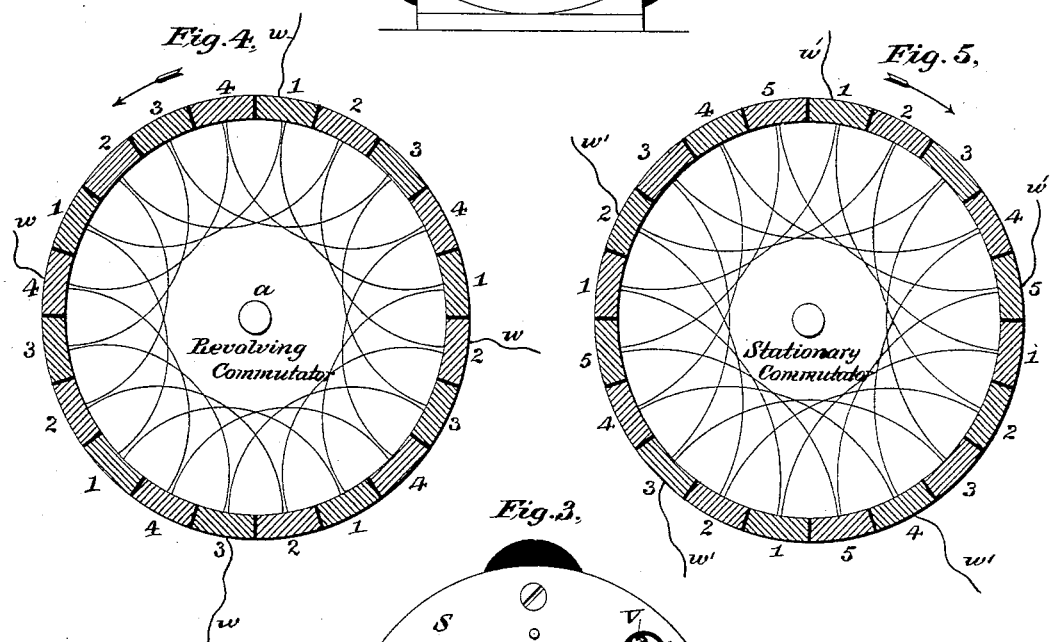
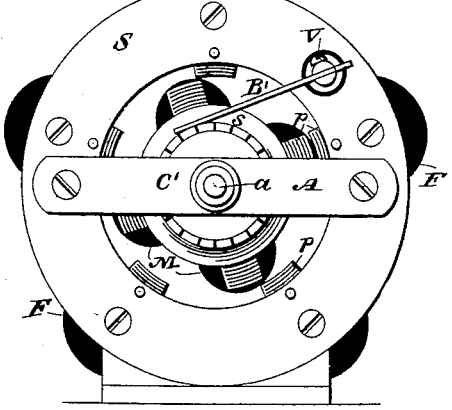

(No Model.) 6 Sheets—Sheet 3.
O. LUGO.
ELECTRIC MOTOR AND DYNAMO ELECTRIC MACHINE.
No. 394,075. Patented Dec. 4, 1888.
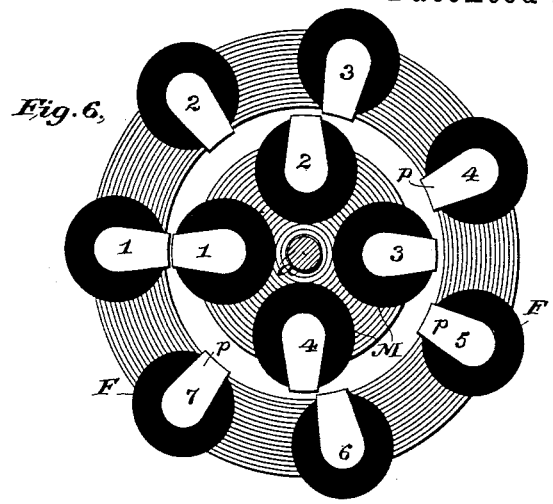
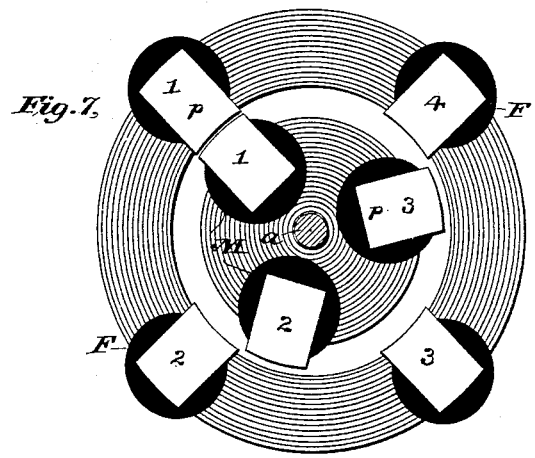
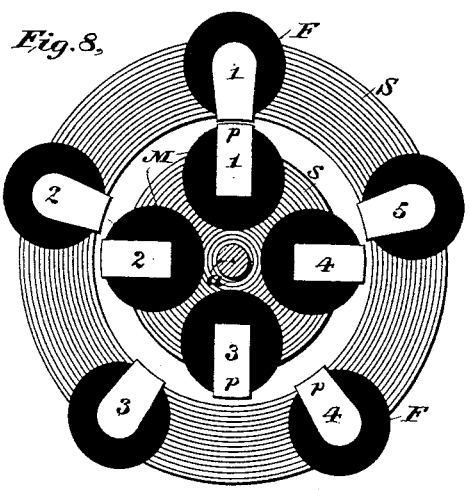
Witnesses,
Geo. W. Breck
Carrie E. Ashley
Inventor,
Orazio Lugo

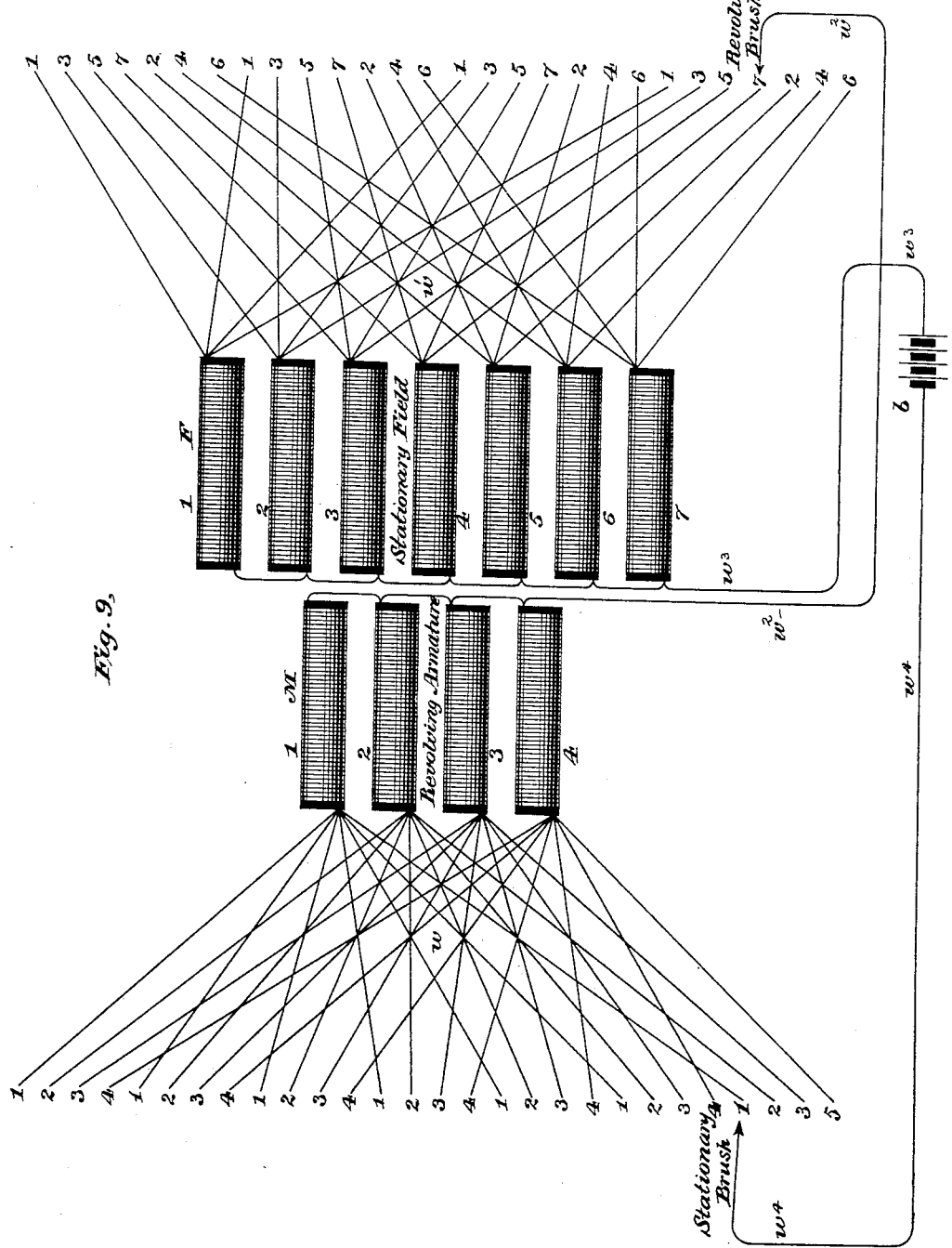

(No Model.)  6 Sheets—Sheet 5.
O. LUGO.
ELECTRIC MOTOR AND DYNAMO ELECTRIC MACHINE.
No. 394,075.  Patented Dec. 4, 1888.
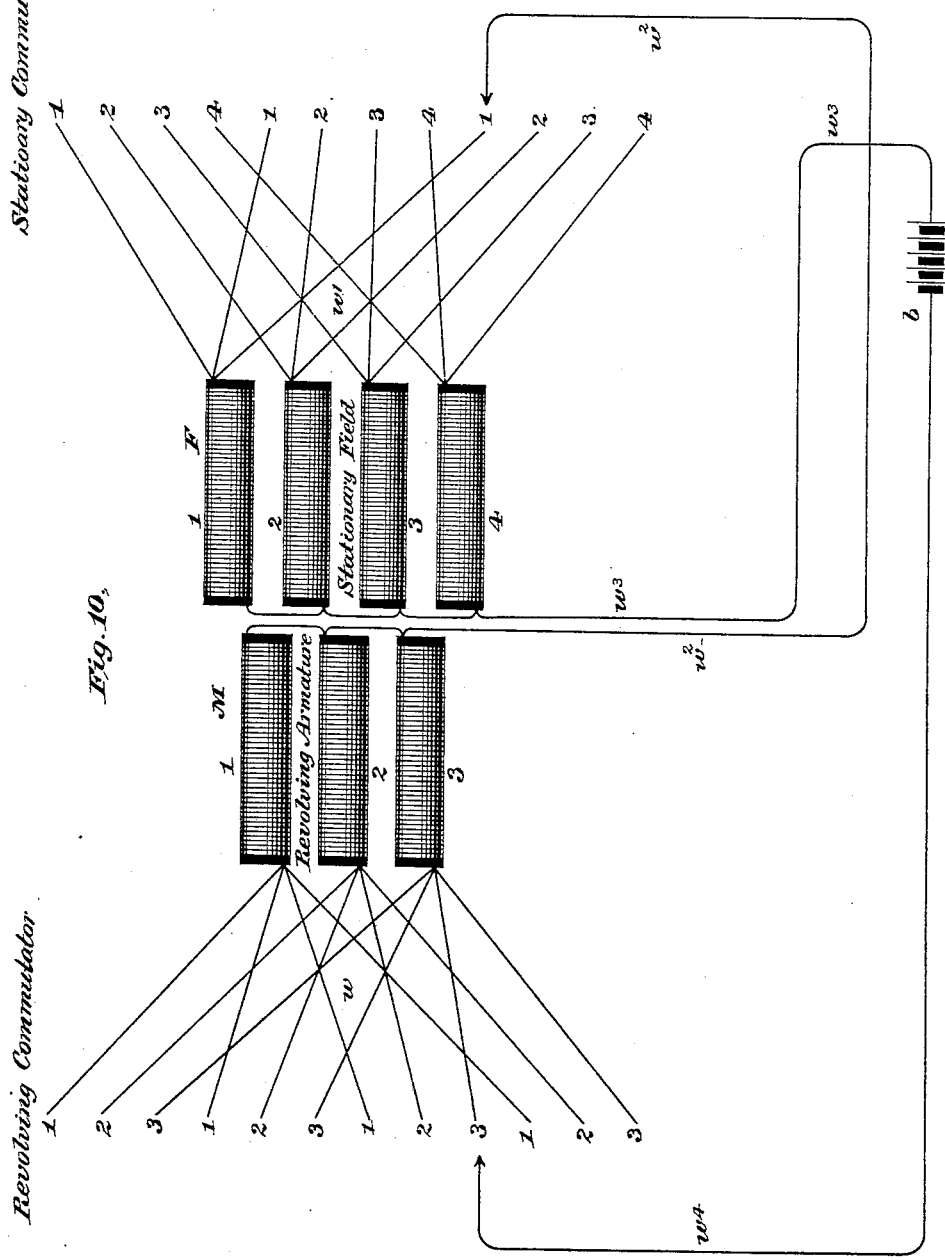
Witnesses.
Geo. W. Breck.
Carrie E. Ashley.
Inventor.
Orazio Lugo

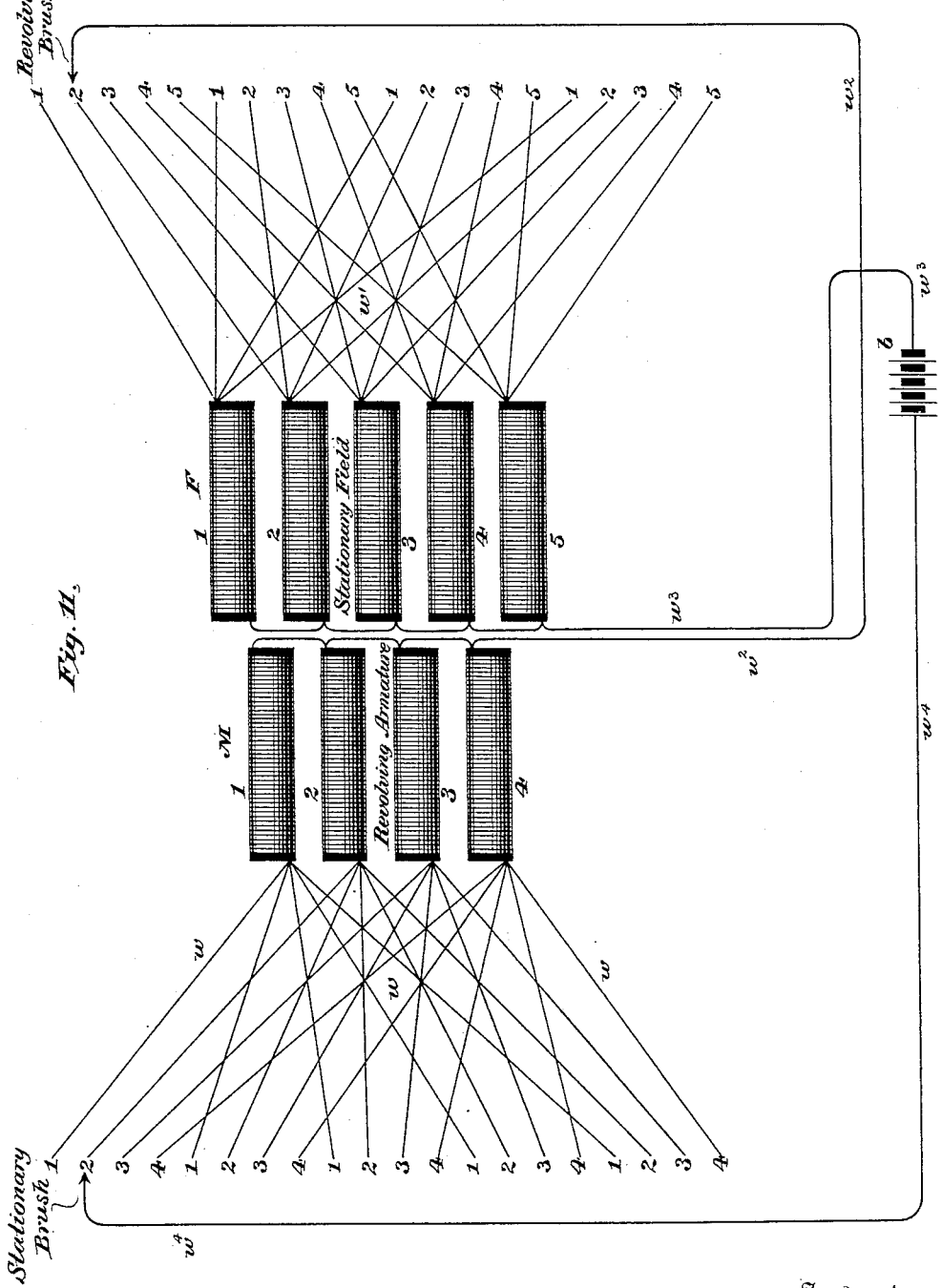

UNITED STATES PATENT OFFICE.

ORAZIO LUGO, OF NEW YORK, N. Y.

ELECTRIC MOTOR AND DYNAMO-ELECTRIC MACHINE.

SPECIFICATION forming part of Letters Patent No. 394,075, dated December 4, 1888.

Original application filed May 1, 1888, Serial No. 272,399. Divided and this application filed July 2, 1888. Serial No. 278,761. (No model.) Patented in England July 3, 1888, No. 9,660; in France July 3, 1888, No. 191,590; in Belgium July 16, 1888, No. 82,453, and in Italy September 8, 1888, XXII, 23,747.

*To all whom it may concern:*

Be it known that I, ORAZIO LUGO, a citizen of the United States, residing in New York, county of New York, and State of New York, have made a new and useful invention in Electric Motors and Dynamo Electric or Magneto-Electric Machines, of which the following is a specification.

My invention relates, broadly, to improvements in the art of operating electric motors and dynamo or magnetic electric machines; and it consists in novel methods of converting electricity into motive power, and vice versa, as will be described in the specification, and particularly pointed out in the claims which follow.

In a prior patent granted to me on the 3d day of July, 1888, and numbered 385,675, I disclosed and claimed a motor by which the methods hereinafter described and claimed can be practiced. I also obtained patents in the following foreign countries upon said apparatus, to wit: England, No. 9,660, July 3, 1888; Belgium, No. 82,453, July 16, 1888; Italy, No. 23,747, September 8, 1888, and France, No. 191,590, July 3, 1888.

The present application is a division of the application upon which the aforesaid domestic Patent No. 385,675 was based; and I therefore make no claim here to the apparatus, this present application being directed to the methods of operation solely. I desire it to be understood, however, that the patent, when granted upon this present application, shall be construed to be limited in its term, in accordance with section 4887 Revised Statutes of the United States, to that foreign patent above named which has the shortest term.

The object of my invention—viz., the conversion of mechanical energy into electricity, and, vice versa, the conversion of electricity into mechanical energy—is accomplished by the utilization of the maximum effects found in placing moving solenoids in proximity to fixed solenoids in such relation that as the armature-coils move, a maximum number of lines of magnetic force is cut in the passage of each armature-bobbin past each field-magnet bobbin, and these effects are made successive, so that there is a continued application of such successive effects.

I create successive magnetic circuits through successive armature and field bobbins in pairs until the series has been gone through once in each complete rotation of the armature, each armature-bobbin being in circuit at least once in a complete revolution with each field-magnet bobbin, and all of the bobbins, both of the armature and field magnets, being allowed to rest magnetically by being entirely cut out of circuit during a fraction of each revolution of the armature, thus avoiding heating and other evil effects.

My invention will be better understood by referring to the accompanying drawings, in which—

Figure 3:
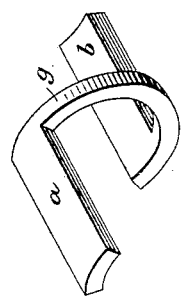
Figure 1:
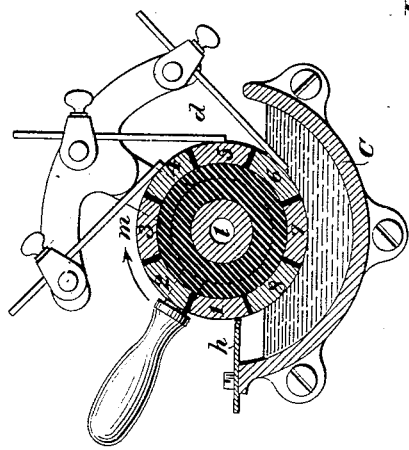

Figure 1 is a side elevational view of my improved machine, which in the future portion of this specification I shall refer to as a "motor," it being understood by electricians that machines of this type are interchangeable as motors and dynamos merely on a reversal of the applied power. Fig. 2 is an end view, as seen looking at Fig. 1 from left to right, the pulley W being removed. Fig. 3 is an end view, as seen looking from right to left, Fig. 1. Fig. 4 is a cross-sectional view illustrating the revolving commutator attached to the armature-shaft with one end of the windings of the individual armature-bobbins (in this instance four in number) connected exteriorly, and also showing the internal segmental connections of the commutator strips or segments. Fig. 5 is a similar view of the stationary commutator and its connections, the five exterior connecting-wires being the individual field-bobbin conductors. Figs. 6, 7, and 8 are vertical cross-sections taken through the body of the machine near one end to show the relation of the field and armature poles, each of which figures illustrates a modified form. Figs. 9 and 10 are diagrams illustrating the circuit-connections in the forms shown in Figs. 6 and 7, the former having four armature and seven field bobbins, while the latter has three armature and four field bobbins. Fig. 11 is field and armature circuits at stated intervals and only when needed, while in motors of well-known types the entire field and armature circuits are kept constantly energized, only a small portion of which is effectively used. I permit all of the field or armature bobbins to rest or be magnetically or electrically discharged at different portions of the armature's rotation, thereby preventing heating and waste of energy. I reduce the Foucault currents created in the machine to a minimum by reducing the effective field and armature circuits with their magnetic cores to a minimum. I also avoid sparking at the brushes by reason of the fact that there is no magnetic lead in the field or armature, inasmuch as the field travels around just in advance of the armature as each bobbin is cut in.

I am aware that it is old to cut out the bobbins of an armature in a dynamo-machine or electric motor during a fraction of the armature's rotation, and I do not therefore claim such feature, broadly; but I believe that it is broadly new with me to cut out both the field and armature circuits conjointly at different points of the armature's rotation, thereby utilizing only that portion of the combined circuit which is needed to propel the motor or create a current in the machine. I do not desire to be understood as limiting myself to the specific constructions shown, and I only submit them as illustrating the best forms known to me for carrying my discovery or invention into practice.

It will of course be understood by those skilled in the art that the principles which I have hereinbefore enumerated are equally applicable to the use of my improved apparatus as a dynamo-electric machine or generator, or that they may be applied with magneto-electric motors or generators, such application being at once obvious.

Having thus described my invention, what I do claim, and desire to secure by Letters Patent of the United States, is—

1. The method of producing motion by means of electrical energy, which consists in successively polarizing the magnets of a fixed and a revolving series to form a complete magnetic circuit, embracing one magnet of each series two or more times during each revolution of the revolving series, substantially as described.

2. The within-described method of operating a dynamo-machine or electric motor, which consists in energizing and de-energizing the field and armature magnets in pairs, each armature being acted upon once in each complete revolution of the armature-shaft by each field-magnet, substantially as described.

ORAZIO LUGO.

Witnesses:
C. J. KINTNER,
J. F. QUINN.

(No Model.)

C. L. BUCKINGHAM.
COMMUTATOR.

No. 394,095. Patented Dec. 4, 1888.

Witnesses.
Geo. W. Breck.
Carrie E. Ashley.

Inventor.
C. L. Buckingham.

N. PETERS. Photo-Lithographer, Washington, D. C.